Jan. 12, 1943. W. G. CORSON 2,308,268
EXPANSIBLE CORE
Filed March 13, 1940
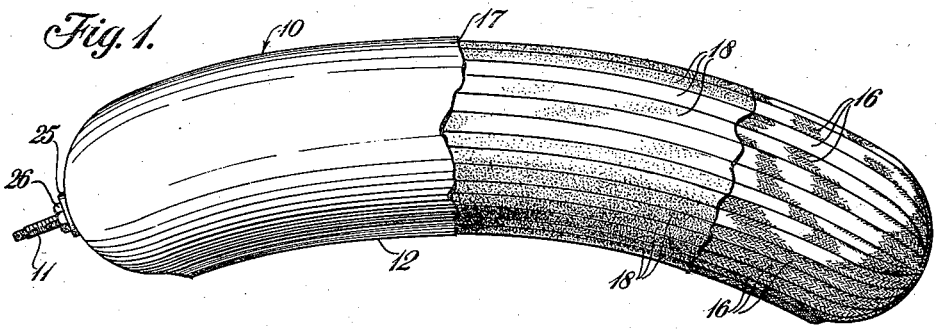
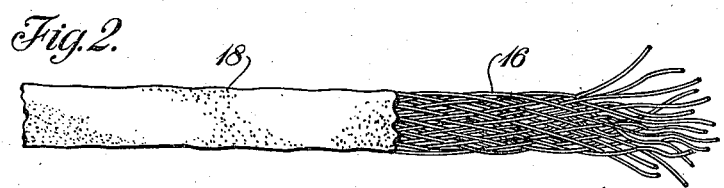
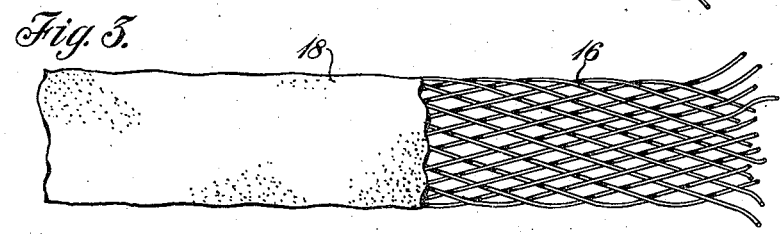
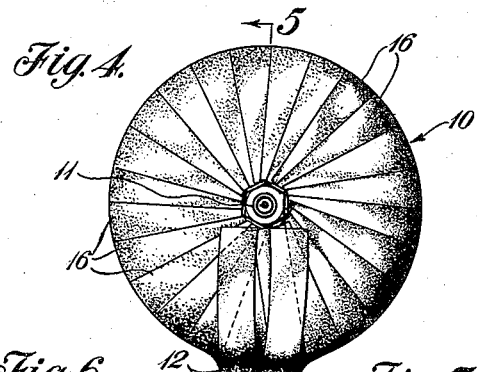
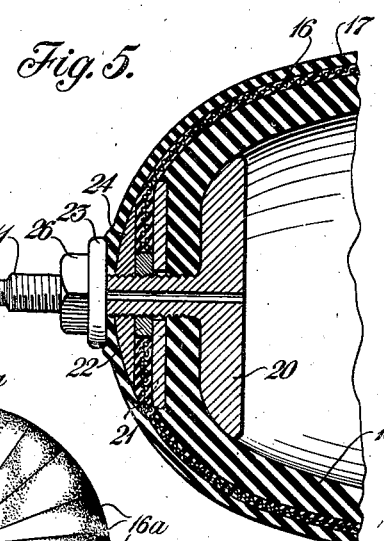
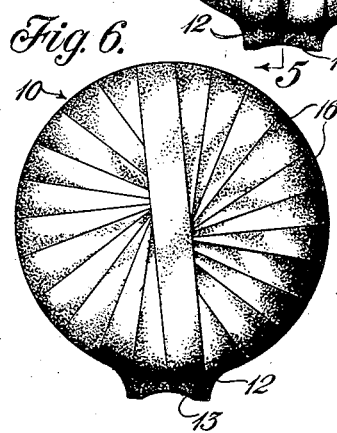
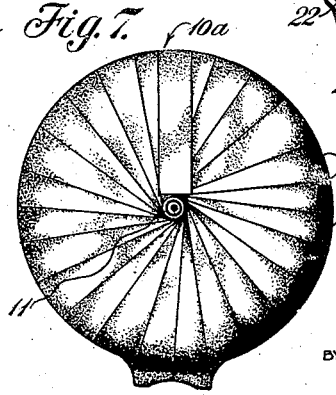
INVENTOR
William G. Corson
BY Ely & Frye
ATTORNEYS Patented Jan. 12, 1943

2,308,268

UNITED STATES PATENT OFFICE 2,308,268

EXPANSIBLE CORE

William G. Corson, Akron, Ohio

Application March 13, 1940, Serial No. 323,743

9 Claims. (Cl. 18—45)

This invention relates to expansible cores, and more especially it relates to inflatable, arcuate structures of less than annular extent such as commonly are used for the repairing of damaged pneumatic tire casings, and frequently referred to as "sectional air bags."

In use, expansible cores of the character mentioned are mounted within a local region of a tire to be repaired, which region also is encased in a heated mold or vulcanizer that confines the same, expansion of the core forcing the wall of the tire casing outwardly against the wall of the vulcanizer, as is common practice in the art. Expansion of the core is required only in a direction radially of its major axis, and it is desirable that elongation of the core in a longitudinal direction be substantially obviated so as to eliminate any drag upon the tire material. Numerous expedients have been employed for restricting elongation of the core while permitting substantial radial distension thereof, and it is to improvement in this feature of the core that this invention primarily is directed.

The chief objects of the invention are to provide an expansible core of the character mentioned that will have relatively long life; that will expand substantially uniformly from end to end thereof; that will return readily to normal shape upon deflation; to provide an expansible core capable of withstanding relatively high internal pressures; and to provide a core that is reinforced in the portions thereof where greatest strain occurs. Other objects will be manifest as the description proceeds.

Of the accompanying drawing:

Figure 1 is a side elevation of an expansible core embodying the invention, a part thereof being broken away to reveal the underlying structure;

Figure 2 is a plan view of a length of rubber-covered woven tape, such as is employed for reinforcing the expansible core, the tape being shown as it appears under longitudinal tension;

Figure 3 is a view of the tape shown in Fig. 2 when the same is subject to transverse strain;

Figure 4 is an end elevation of the core, at the valve end thereof, during manufacture, showing how the ends of the reinforcing tapes terminate thereat;

Figure 5 is a section through the valve end of a finished core, substantially on the line 5—5 of Fig. 4;

Figure 6 is an elevation of the closed end of the core, during manufacture, showing the arrangement of the reinforcing tapes thereat; and Figure 7 is an elevation of the valve end of another embodiment of the invention, during the manufacture thereof, showing the arrangement of the tape thereat when the reinforcement consists of a single, continuous tape.

Referring to the drawing, there is shown a core that is designated as a whole by the numeral 10, said core consisting of a tubular, arcuate structure of reinforced rubber composition having rounded closed ends. The core illustrated has a valve stem 11 mounted in one end thereof for the admission of air under pressure to the interior of the core, whereby the latter is distended in a radial direction with relation to its longitudinal axis. In some vulcanizing processes it is desirable to use steam as the medium for expanding the core, and in such cases the core may be provided with valve stems at both ends thereof to provide the necessary circulation of the steam. The structure 10 generally is of uniform wall-thickness throughout except at its ends, which are thicker due to greater amount of reinforcement therein. In transverse section the core is shaped to conform to the interior profile of a pneumatic tire casing, and along its bottom or concave surface is an offset portion 12 designed to fit between the bead portions of a tire casing. The offset portion 12 has a longitudinally extending re-entrant or corrugation 13 that enables the offset portion to spread laterally, upon inflation of the core, and thereby to force the bead portions of a tire into conformity with the vulcanizing mold in which the tire is confined.

The structure 10 comprises an inner body portion 15 of vulcanized rubber, reinforcement consisting of a circumferential series of longitudinally extending convolutions of braided tape 16, and a relatively thin surface covering of rubber composition 17, the whole being vulcanized together to provide a unitary structure having a smooth surface. To provide an improved union of the constituent parts of the core, the tape 16 is provided with a rubber coating 18 before being incorporated in the core.

The braided tape 16 consists of a plurality of strands, which strands may be of any suitable material, but preferably are of steel wire, and are so illustrated herein. All of said strands extend substantially longitudinally of the structure and are braided or intertwined with each other, said strands having high tensile strength, the tape being similar to that formerly employed in the rubber industry for the cores of tire beads. The rubber covering 18 of the tape is in unvulcanized condition at the time the tape is applied to the body portion 15, during the manufacture of the core, said tape being applied to said body portion while under longitudinal tension, at which time it appears as best shown in Fig. 2. In Fig. 3 the tape is shown in transversely expanded condition, this figure clearly illustrating how the tape opens to enable radial expansion of the core under internal pressure.

The valve stem 11 of the expansible core is formed on its inner end with a relatively large, integral, metal flange 20, Fig. 5, which flange is disposed within the inner chamber of the core, the body portion 15 of the latter being folded over the outwardly directed lateral face of the flange and pressed thereagainst by a metal plate or washer 21 that is retained in place by a collar 22 that is forced onto the valve stem 11. If the core is to be expanded by steam pressure, a valve stem construction identical with that described may be incorporated in the opposite end of the core.

The rubber covered tape 16 is applied to the body portion 15 parallel to the longitudinal axis thereof, the convolutions of tape being parallel to each other and in laterally abutting relation, or slightly overlapped, throughout the major portion of the core, and being in overlapping relation at the rounded ends thereof. The tape is applied to the said body portion 15 while under longitudinal tension that narrows the tape as is shown in Fig. 2, the tape being anchored at each end of the core so as to retain the tapes in tensioned condition. The anchoring of the tape at opposite ends of the core may be effected in different ways, one of which is shown best in Figs. 4 to 6. In this instance the tape is cut into lengths equal to about twice the length of the core. Then one end of a tape is anchored to the metal plate or washer 21, the tape is laid longitudinally of the body portion, under tension, and passed diametrically around the opposite end thereof as shown in Fig. 6, the other end of the tape being brought back to the metal washer 21 and anchored thereto. The anchoring of the tape ends is made permanent preferably by spot welding them to the plate 21. In like manner successive tapes are applied to the body portion 15 until the entire structure is covered by the tapes. The latter may then be united to each other at the closed end of the core by spot welding at the axis of the core, although this step may be dispensed with if desired, since the absence of tape ends at this end of the core assures that there will be no shifting of the tapes. Thus it will be seen that although the major portion of the core has but a single reinforcing layer of tape, the overlapping of the tapes at the ends of the core will thicken said ends and additionally reinforce them. After the core is completely covered with the rubberized tape, a filler disc 24 of stiff composition such as metal, hard rubber, or rubberized square woven fabric is mounted upon the valve stem 11 over the ends of the tapes 16, after which the rubber cover or sheath 17, in unvulcanized condition is mounted upon the core so as to cover the same except for the valve stem 11. Thereafter the assembled structure is vulcanized in a mold that imparts the desired shape thereto. The core is completed by the application of a washer 25 and nut 26 to the valve stem 11, the arrangement being such as to assure a firm anchorage of said valve stem.

The improved core is utilized in repair vulcanizers in the same manner as expansible cores previously provided for the same purpose. Thus when air or steam under pressure is admitted to the core, the same expands radially to force a region of a tire being repaired into engagement with the surface of a vulcanizer mold, the strands of the braided tape 16 opening up, as shown in Fig. 3, with the expansion of the core. This spreading of the strands of the tape increases the longitudinal tension of the same, and thereby causes them completely to counteract the expansive force of the inflation fluid in its tendency to cause longitudinal elongation of the core.

The feature of coating the tape 16 with an unvulcanized rubber cover 18 assures that the interstices of the tape will be filled with rubber, thus assuring an adequate bond between the body portion 15 and rubber sheath 17 of the core, whereby separation of the plies thereof during use substantially is obviated. The invention provides an expansible core that has relatively long life as compared to expansible cores heretofore provided, that is capable of withstanding relatively high pressure, that comprises reinforcing elements that are not deleteriously affected by repeated heatings and coolings, and that achieves the other advantages set out in the foregoing statement of objects.

The embodiment of the invention shown in Fig. 7 of the drawing and designated 10a differs from that previously described in that the reinforcing tape 16a is in a single continuous length, and is incorporated in the core in a succession of convolutions that laterally abut each other in the major portion of the core and overlie each other at the ends thereof. The said convolutions extend diametrically about the closed end of the core, but at the valve-end of the core they are disposed tangential to the valve stem 11 as shown. Since this method of applying the reinforcing tape leaves but one end of the latter unconfined, it is possible to dispense with the spot welding employed to anchor the ends of the tapes of the previously described embodiment of the invention, and to anchor the single outer tape-end by means of a suitable adhesive or by means of a small patch of rubberized fabric. This method of applying the tape also enables the plate 21, nut 22, and filler discs 24 of the previously described embodiment to be dispensed with.

Other modifications may be resorted to without departing from the spirit of the invention, or the scope thereof as defined by the appended claims.

What is claimed is:

1. An expansible core of the character described comprising an elongate hollow rubber structure having its walls reinforced with flexible tape, that has its ends anchored in one end of the structure, said tape consisting of a plurality of strands braided together with each strand crossing over and under other strands obliquely back and forth across the tape, and formed with reverse bends at the edges of the tape.

2. An expansible core of the character described comprising a hollow rubber structure having its walls reinforced by flexible tape that is composed of a plurality of strands of material braided together with each strand crossing over and under other strands obliquely back and forth across the tape and formed with reverse bends at the edges thereof, and is normally under longitudinal tension such as to elongate the tape in a longitudinal direction and narrow it in transverse direction.

3. An expansible core of the character described comprising an elongate hollow rubber structure having its walls reinforced with flexible tape disposed interiorly of said walls and having its ends anchored in one end thereof, said tape comprising a plurality of strands of wire that are braided together with each strand crossing over and under other strands obliquely back and forth across the tape and formed with reverse bends at the edges thereof.

4. An expansible core of the character described comprising a hollow distensible rubber structure having its wall reinforced by a plurality of lengths of braided tape, said tapes extending longitudinally of the core and about one end thereof, and having their respective ends anchored upon the opposite end of the core.

5. An expansible core of the character described comprising an elongate hollow rubber structure having its walls reinforced with transversely expansible strip material comprising wires intertwined with each other and extending substantially longitudinally thereof, said strip material extending parallel to the longitudinal axis of the core, and having its ends anchored within the wall of the structure at one end thereof.

6. An expansible core of the character described comprising an elongate, hollow rubber structure having its walls reinforced with strip material comprising wires that extend from one end of the core to the other and are braided together, said strip material having limited transverse extensibility and so arranged as to be transversely extended upon transverse expansion of the core, said strip material having its ends anchored in the wall of the structure at one end thereof.

7. An expansible core of the character described comprising an elongated hollow rubber structure, a metal plate in the wall thereof at one end of the structure, and reinforcement in the core wall extending longitudinally thereof, said reinforcement comprising braided wire tape having its ends permanently secured to said metal plate.

8. An expansible core of the character described comprising an elongated hollow rubber structure, a valve stem extending through one end, at least, of said structure, and reinforcement in the core wall comprising braided tape, said tape extending longitudinally of the core and about the ends thereof, said tape being disposed tangentially of said valve stem.

9. An expansible core of the character described comprising an elongated hollow rubber structure having rounded closed ends, a valve stem extending through one end of the structure and formed with a flange disposed interiorly of the core, a metal plate on the valve stem, a nut on the valve stem forcing said plate toward said valve-stem flange to confine a portion of the core-wall therebetween, and reinforcement of braided wire tape in the core-wall and attached to said plate therein.

WILLIAM G. CORSON.